United States Patent

Söhnlein

Patent Number: 5,746,095
Date of Patent: May 5, 1998

[54] METHOD OF FORMING ROTARY DRILLING TOOLS

[75] Inventor: Dieter Söhnlein, Kaufering, Germany

[73] Assignee: Hilti Aktiengesellschaft, Schaan, Liechtenstein

[21] Appl. No.: 664,720

[22] Filed: Jun. 17, 1996

[30] Foreign Application Priority Data

Jun. 17, 1995 [DE] Germany .................. 195 22 033.1

[51] Int. Cl.⁶ .................................................. B21K 5/04
[52] U.S. Cl. .................................. 76/108.6; 408/230
[58] Field of Search .......................... 76/108.1, 108.4, 76/108.6; 408/144, 145, 230

[56] References Cited

U.S. PATENT DOCUMENTS

| | | | |
|---|---|---|---|
| 302,600 | 7/1884 | Stetson | 76/108.6 X |
| 3,706,504 | 12/1972 | Simonffy | 408/230 X |
| 4,696,334 | 9/1987 | Haussmann | 408/230 X |

FOREIGN PATENT DOCUMENTS 736423  9/1955  United Kingdom .......... 408/230

*Primary Examiner*—Douglas D. Watts
*Attorney, Agent, or Firm*—Anderson, Kill & Olick, P.C.

[57] ABSTRACT

Method of forming rotary drilling tools (1) for working on materials subject to brittle failure, such as drilling tools or hammer drilling equipment, includes shaping an axially extending conveying helix (3) in an axially extending tool blank (11) and forming the conveying helix (3) in a region between an axially extending cutting head region (4) at one end of the blank and an axially extending shank (2) at the other end of the blank. The cutting head region (4) is free of any conveying helix and has an axial extent of at least 10% of the maximum diameter (d) of the rotary drilling tool in the axially extending region of the conveying helix.

5 Claims, 3 Drawing Sheets

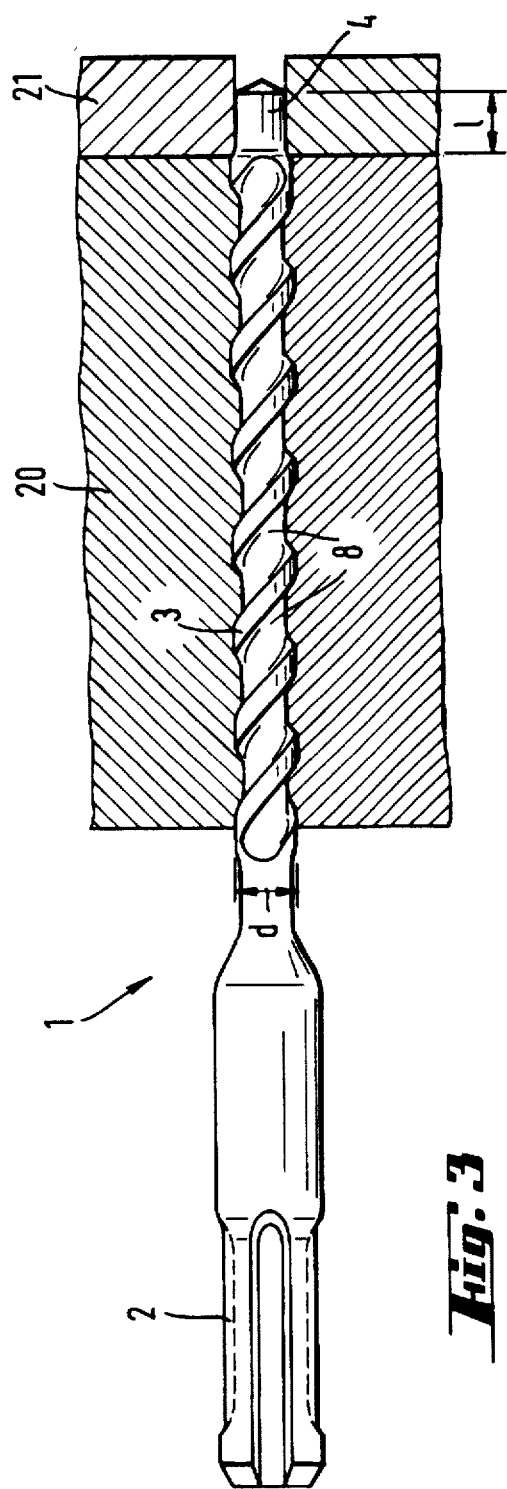
Fig. 3
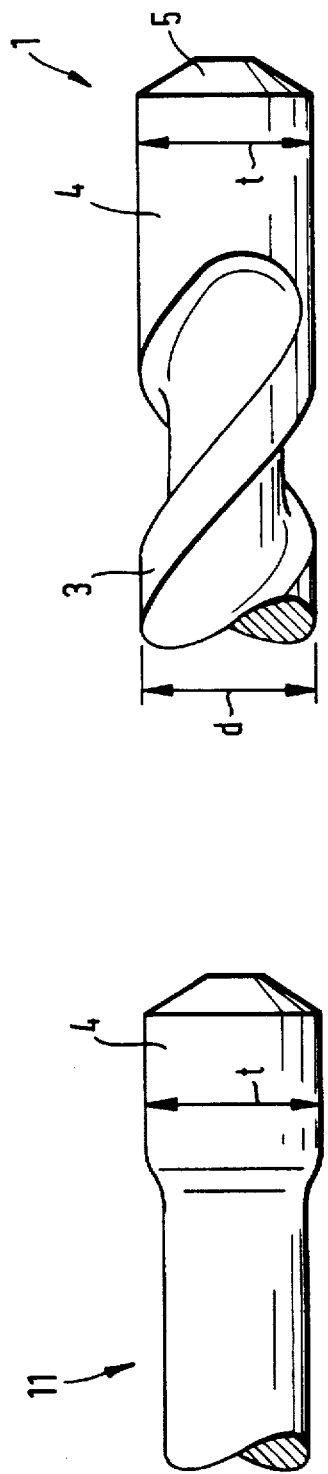
Fig. 5
Fig. 4

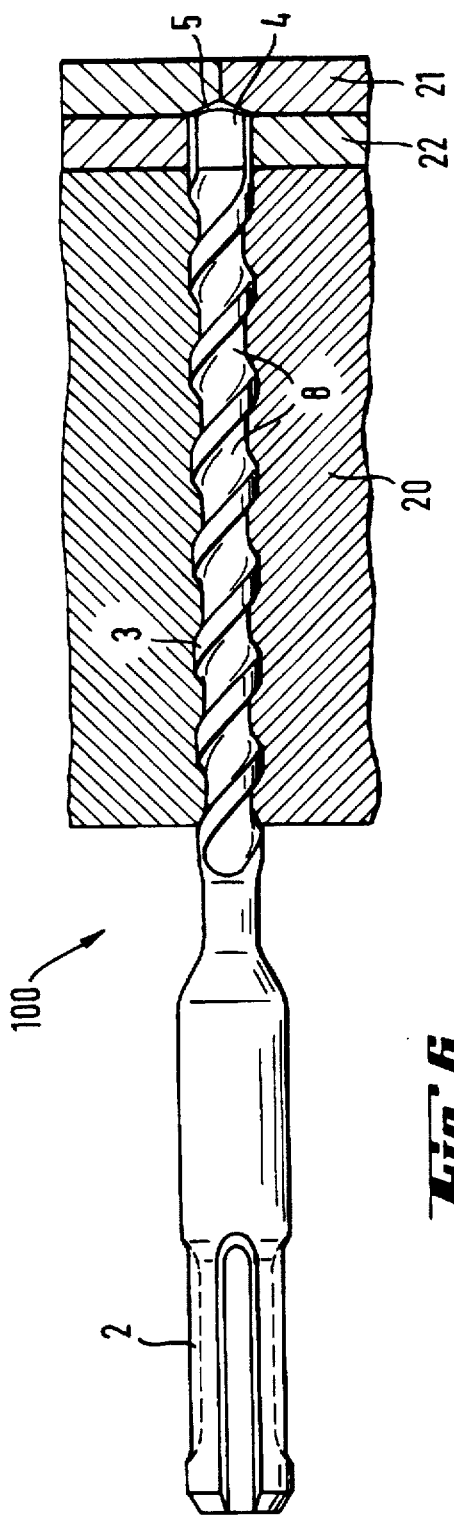
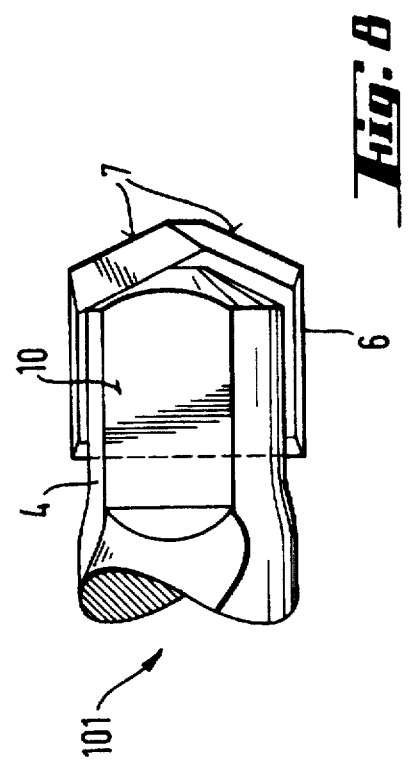
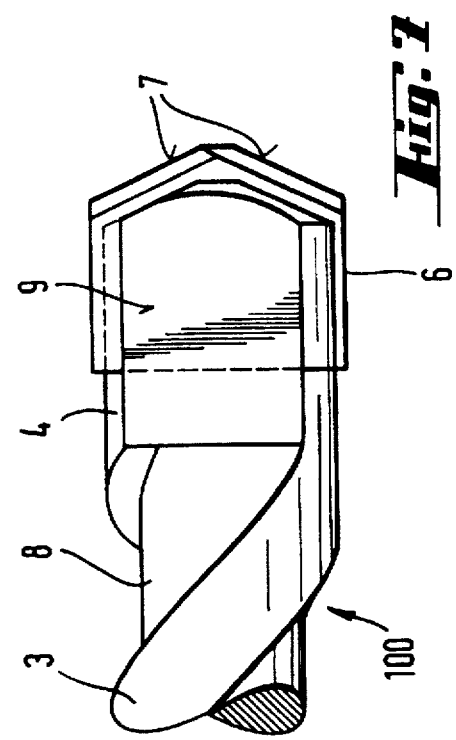

METHOD OF FORMING ROTARY DRILLING TOOLS

BACKGROUND OF THE INVENTION

The present invention is directed to a method of forming rotary drilling tools for working on materials subject to brittle failure and, in particular, for forming rock drilling tools for hammer drilling equipment.

For work on materials subject brittle failure, such as rock, concrete and masonry, it is conventional to use rock drilling tools having cutting edges made of hard material arranged at the leading end of the tool, that is, its cutting head. Generally the cutting edges are provided on hard metal elements fitted into the leading end side or head side of the tool and soldered or fastened in some other way. These known rotary drilling tools have a fluted conveying region extending from the cutting edges to just short of the opposite trailing shank end. The turns of the conveying flutes form conveying grooves which serve to carry off the drilled material or drilling dust during the operation of the drilling tool.

The conveying flutes can be produced in different ways, for instance, by twisting or cross rolling a heated rod shaped tool blank or semi-finished product or by cutting. It has also been attempted to form the conveying flutes in a rolling process. Rolling processes such as cylinder rolling, flat jaw rolling or segmental jaw rolling are known from the thread manufacturing field and are distinguished by their economy. In rotary drilling tools formed by rolling processes, the conveying helix extends at a constant pitch up to the leading end of the tool at which the hard metal elements form the cutting edges. The hard metal elements can be a hard metal tip inserted into a slot at the leading end or hard metal shaped parts fastened in recesses at the leading end.

Because the conveying grooves or flutes run at a constant pitch, the wall thickness in the region of the slots or recesses for the hard metal elements varies considerably. As a result, the attachment of the hard metal tip or hard metal shaped parts along the diameter of the rotary drilling tool at the leading end varies in strength. The stability of the attachment of the hard metal tips or hard metal shaped parts is, however, very important to the useful lifetime of the rotary drilling tool. Therefore, it is not surprising that such rotary drilling tools with conveying flutes produced in rolling operations are offered only in the less demanding market for household applications, where these known rotary drilling tools are generally used only in connection with conventional drilling devices in which the cutting head need only transmit axial blows of relatively slight force to the material being drilled. In general, these known rotary drilling tools are also used chiefly for working on light masonry which is the reason they are usually marketed as "masonry drills".

Hammer drilling equipment is conventionally used for professional applications for applying axially directed blows of relatively high force to the rotary drilling tool, that is, electropneumatically. The axial blows are transmitted into the material being worked by the cutting edges at the leading end of the bit. As a result, the attachment of the hard metal tips or hard metal shaped parts carrying the cutting edges is highly stressed and can lead to an unacceptably rapid failure in tools with flutes produced by a rolling process.

SUMMARY OF THE INVENTION

Therefore, the primary object of the present invention is to improve a method for the production of rotary drilling tools, so that rotary drilling tools for work on material subject to brittle failure also have an acceptable useful lifetime for professional applications. In so doing, the economy of the manufacturing method will be maintained.

In accordance with the present invention, for forming rotary drilling tools for working on material subject to brittle failure, in particular for the production of a rock drilling tool for hammer drilling equipment, a tool blank or semi-finished member is provided with conveying flutes in a shaping step. The conveying flutes are formed in a region of the tool blank extending between a shank at the trailing end and a cutting head region at the leading end where the cutting head region is free of the conveying flutes and extends axially for at least 10% of the maximum diameter of the tool in the region of the conveying flutes.

Because the conveying flutes are produced in accordance with the invention in such a way that the cutting head region of the rotary drilling tool carrying the cutting edges is free of the conveying flutes, the head region of the rotary drilling tool is provided with a shape such that the hard metal tip carrying the cutting edges in the slot or the wall thickness of the region adjoining the recesses for the hard metal shaped part remains uniform and is not weakened by a terminating conveying flute or groove, as is the case in known rotary drilling. Accordingly, a very stable attachment or securement of the hard metal tip or the hard metal parts is achieved. Owing to such stable attachment, the hard metal tip or the hard metal shaped parts can also favorably transmit the high percussion forces generated by hammer drilling equipment to the material being drilled without loosening prematurely. The useful life of rotary drilling tools for hammer drilling equipment produced according to the invention is increased and also leads to the requirements for professional use.

In an advantageous variation of the method according to the invention, the cutting head of the tool having no conveying flute is formed with a diameter corresponding substantially to the diameter of the tool in the region of the conveying flutes. This can be achieved in a simple manner in that the tool blank or semi-finished product used in the shaping process for forming the flutes has a cutting head region with a diameter which is greater than the diameter of the region of the tool blank or semi-finished product in which the flutes are to be produced and has an enveloping circle diameter or outside circle diameter of the produced helix. In a rotary drilling tool having a cutting head region formed in this manner, the hard metal tip is practically completely embedded in the head region and hardly projects outwardly from the circumference of the tool.

In another embodiment of the method of the present invention, the diameter of the cutting head region is reduced in some sections. In this way, the tool head is compressed and the grip on the hard metal tip carrying the cutting edges is further improved. Accordingly, a drilling output of the tool can be improved. The compression of the cutting head of the tool can be effected by flat stamping, so that it has at least two faces that are located opposite one another and extend approximately parallel to one another. This improves the removal of the drilling dust from the bore hole and benefits the drilling output.

In yet another advantageous variation of the method, the cutting head region of the rotary drilling tool is provided with at least two grooves located approximately opposite one another terminating axially at the cutting edge and open in a substantially continuous manner into the conveying grooves formed by the flutes between the turns of the conveying helix. The axially terminating grooves impede the embedding of the hard metal tip carrying the cutting edges only to a negligible degree and improve transport of the drilling material during the use of the tool.

The cutting head region of the rotary drilling tool can be shaped in a separate method step after the conveying flutes are formed. The shaping of the cutting head is, however, advantageously effected at the same time that the conveying flutes are produced. The shaping is effected in the same device and no adjustment is required which simplifies the overall method.

The production of the conveying flutes and, as the case may be, the shaping of the cutting head are advantageously carried out in a cold rolling process or a warm rolling process. In so doing, it is no longer necessary to heat the tool blank or semi-finished product to high temperatures before shaping. This shortens the shaping operation and reduces the required energy consumption. Material stresses, dimensional discrepancies and imprecise synchronization due to heating and recooling can be prevented.

Cylinder rollers, flat jaw rollers or segmental jaw rollers having one or more shaping segments are preferably used as devices for rolling the tool blank or semi-finished product. The principles of such devices are known from the formation of threads and has been proven. These known devices are particularly suitable for the production of a great number of pieces and allow manufacture in a continuous operation.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

BRIEF DESCRIPTION OF THE DRAWINGS

In the drawings:

FIG. 3 is an axially extending view of a rotary drilling tool similar to the tool shown in FIG. 1 positioned within a rolling die shown in section;

FIG. 4 is a partial view of the tool blank showing its cutting head region;

FIG. 5 is an axially extending view showing the cutting head region of a rotary drilling tool shaped in a rolling die from a tool blank according to FIG. 4;

FIG. 6 is another example of an axially extending rotary drilling tool shaped in a rolling die in accordance with another embodiment of the method according to the present invention;

FIG. 7 is a view of a cutting head region of the rotary drilling tool displayed in FIG. 6; and FIG. 8 is a view of the cutting head region of a rotary drilling tool formed in accordance with another embodiment of the method according to the present invention.

DETAILED DESCRIPTION OF THE INVENTION

Figure 1:
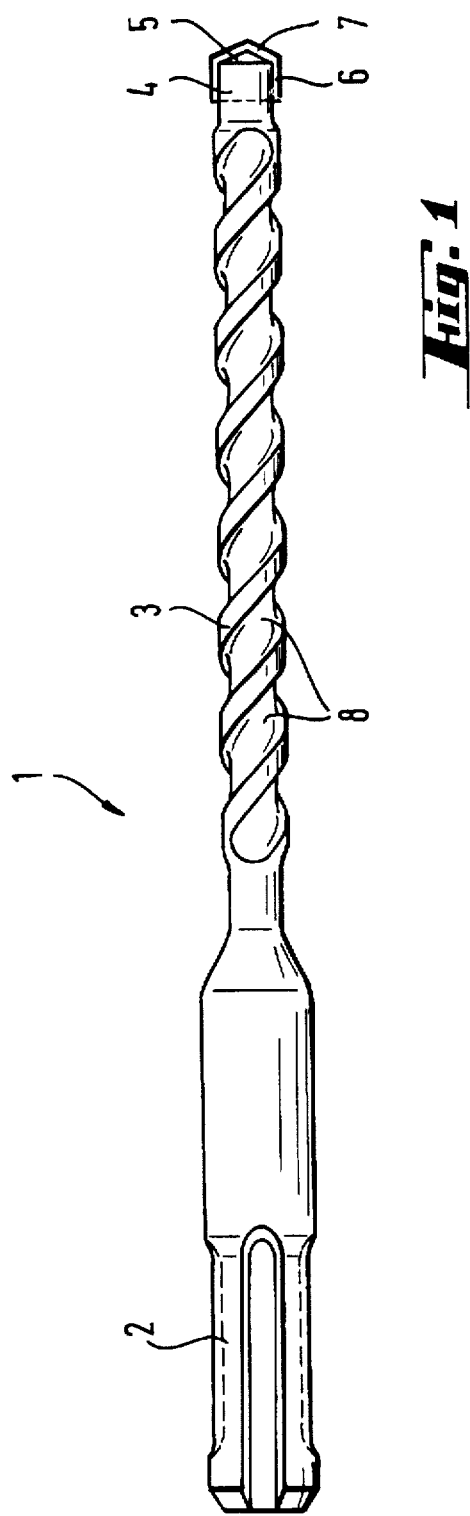
FIG. 1 is an axially extending view of a rotary drilling tool formed in accordance with the method of the present invention.

In FIG. 1, a rotary drilling tool 1 is illustrated formed in accordance with a first embodiment of the method according to the present invention. The rotary drilling tool 1 is an axially extending member having a leading end at the right hand end and a trailing end at the left hand end. The rotary drilling tool has an axially extending shank 2 at its trailing end with rotary driving grooves and axially extending retaining grooves, not described in more detail, an axially extending region having a conveying helix 3 with conveying grooves or flutes 8 extending between the turns of the conveying helix 3, and a cutting head 5 at its leading end containing a hard metal tip 6 with cutting edges 7. Conventionally, a slot, not described in more detail, is arranged in the cutting head region 5 with the hard metal tip 6 being soldered or secured in some other manner. The rotary drilling tool formed by the method of the present invention has a cutting head region which secures or encloses the hard metal tip 6 and adjoins the conveying helix 3. In place of a hard metal tip, a hard metal shaped part carrying the cutting edges can be inserted into recesses at the leading end of the tool blank.

The cutting head region 4 of the rotary drilling tool 1 extends for an axial length 1, note FIG. 3, corresponding to at least 10% of the maximum diameter d of the rotary tool 1 in the region of the conveying helix and the cutting head region is free of the conveying helix. In conventional rotary drilling tools, the axial extent 1 of the cutting head region is not greater than the length of the region having the conveying helix 3. The present embodiment of the rotary drilling tool 1, formed in accordance with the present invention, has a maximum diameter d in the region of the conveying helix 3 greater than the diameter of the rotary drilling tool 1 in the cutting head region 4. This occurs due to the displacement of material occurring in the formation of the conveying helix 3.

Figure 2:
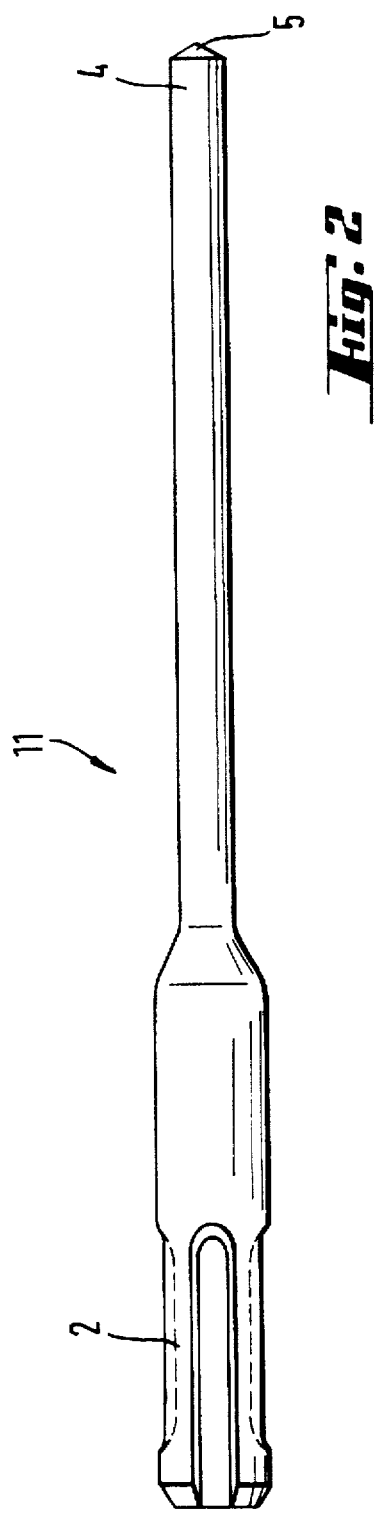
FIG. 2 is an axially extending view of a tool blank for carrying out the method of the present invention.

In FIG. 2 a tool blank 11 or semi-finished product is shown to be further processed by rolling to produce the rotary drilling tool 1 according to the present invention. The shank 2 is already formed and is provided with rotary driving grooves and retaining grooves which are not otherwise described. The region in which the conveying helix 3 is to be produced by a rolling process has the same diameter along its axial extent to the leading end 5 of the tool as that which the subsequent cutting head region 4 of the drilling tool is to be provided.

FIG. 3 displays a rotary drilling tool 1 formed in a rolling die from the tool blank as shown in FIG. 2. The rolling die shown only in part in the drawing, has a flute forming section 20 and a head stop plate 21. The desired conveying helix geometry with the desired quantity of turns and pitch of the conveying helix turns 3 is shaped into the tool blank by a means of the flute forming section 20. The rotary drilling tool obtains its diameter d in the region of the conveying helix 3 due to the material displacement occurring during shaping. The head stop plate 21 engages around the cutting head region 4 with a rotary drilling tool 1 for its axial extent 1 and prevents a change in diameter. The special design of the head stop plate 21 ensures that the cutting head region 4 is not affected by the helix shaping step and retains its original shape.

FIG. 4 shows a leading end portion of a tool blank 11 which has a thickened cutting head region 4 compared to the region in which the conveying helix is to be formed in particular, the diameter t of the cutting head region 4 of the tool blank 11 is selected so that it corresponds to the maximum diameter d of the rotary drilling tool in the axially extending region of the conveying helix 3 after the helix is formed as is shown and, in FIG. 5 accordingly, the rotary drilling tool 1 has the same diameter from the region containing the conveying helix 3 up to the cutting head or leading end 5. It will be understood that the head stop plate of the rolling die in this case has an opening whose diameter corresponds to the expanded diameter t of the cutting head region 4 of the tool blank 11. With a suitably selected diameter of the cutting head region 4 of the tool blank, the cutting head region of the tool subsequently provided with fluting can be slightly greater than the diameter of the tool in the region of the conveying flutes. However, it will also be evident that the head diameter corresponds at most to the enveloping circle diameter of the hard metal tip carrying the cutting edges.

FIG. 6 illustrates a rotary drilling tool 100 formed by a rolling process according to another embodiment of the method according to the present invention. The rotary drilling tool 100 has a shank 2 with rotary driving grooves and retaining grooves not otherwise described in detail. The conveying helix 3 is produced in a flute forming section 20 spaced from the head stop plate 21 of the rolling die. The head section 22, serving for the special shaping of the cutting head region 4 of this modified rotary drilling tool 100, is arranged between the flute forming section 20 and the head stop plate 21.

FIGS. 7 and 8 show two variations of the cutting head region 4 of the rotary drilling tool. In the embodiment in FIG. 7, the cutting head region 4 has at least two grooves 9 which are located opposite one another and terminate axially at the leading end, only one groove is shown in the drawing. The purpose of this embodiment is that the transition from the conveying grooves flutes 8 extending between the turns of the conveying helix 3 to the axially terminating grooves 9 extends substantially continuously as can be seen from FIGS. 6 and 7 whereby the cutting head region 4 has the same diameter as the region of the rotary drilling tool carrying the conveying helix. Therefore, this embodiment of the rotary drilling tool is produced from a tool blank having a increased diameter cutting head. FIG. 7 also shows the hard metal tip 6 with cutting edges 7 which is uniformly gripped by the cutting head region 4 of the rotary drilling tool 100.

The rotary drilling tool 101 shown in FIG. 8 has a cutting head region 4 which has a smaller diameter than that of the region containing the conveying helix. Accordingly, this embodiment of the rotary drilling tool corresponds to the rotary drilling tool 1 shown in FIG. 1. A difference from that tool is that the cutting head region is profiled, that is, flat stamped, and has at least two faces 10 which are located opposite one another. FIG. 8 shows only one face 10. As a result of the stamping of the faces 10, the diameter in the head region is increased slightly and approximates the diameter of the region of the rotary drilling tool 101 having the conveying helix. This embodiment of the cutting head region 4 can be produced in a rolling device according to FIG. 6, the head section being modified in accordance with the desired head shape. It is also possible, however, to form the faces 10 after the conveying flutes have been produced in the rolling process, that is, by means of stamping dies. The hard metal tip 6 carrying the cutting edges 7 is gripped very securely as a result of the flat stamping of the cutting head region of the rotary drilling tool 101 and the hard metal tip 6 projects only slightly beyond the circumference of the rotary.

The rolling apparatus used for the variations of the method according to the invention are preferably rolling devices for cold rolling or warm rolling shaping operations. For example, cylinder rollers, flat jaw rollers or segmental jaw rollers having one or more shaping segments, can be used for rolling a tool blank or semi-finished product. Because the conveying flutes are produced in the method according to the invention in such a way that the cutting head region of the rotary drilling tool containing the cutting edges has no conveying flutes, the cutting head region of the rotary drilling tool 4 has a shape such that the wall thickness of the hard metal tip carrying the cutting edges at the slot or respectively, the wall thickness of the region adjoining the recesses for the hard metal shaped parts remains uniform and is not weakened, as is the case in conventional rotary drilling tools where a conveying flute runs out at a constant helix angle. This results in a very stable attachment or securement of the hard metal tip or hard metal shaped parts. Owing to the stable attachment, the hard metal tip or hard metal shaped parts can also favorably transmit the high percussion forces, generated by hammer drilling equipment, to the base material being drilled without prematurely loosening their attachment. The useful life of the rotary tools or hammer drilling equipment, which are produced according to the present invention, is, accordingly, increased and meets the requirements for percussion use.

While specific embodiments of the invention have been shown and described in detail to illustrate the inventive principles, it will be understood that the invention may be embodied otherwise without departing from such principles.

I claim:

1. Method 3, of forming rotary drilling tools (1, 100, 101) for working on materials subject to brittle failure, such as rock drilling tools for hammer drilling equipment, comprising shaping an axially extending conveying helix (3) in an axially extending tool blank (11) with the helix being arranged in an axially extending section of the tool blank between an axially extending shank (2) and an axially extending cutting head region (4), forming the cutting head region (4) free of any conveying helix with an axial extent (1) of at least 10% of the maximum diameter (d) of the tool in an axially extending region of the conveying region, forming the cutting head region (4) with the diameter (d) of the cutting head region reduced in parts thereof and forming said cutting head region (4) with at least two faces (10) located opposite one another and extending approximately parallel to one another.

2. Method, as set forth in claim 1, wherein forming the head region (4) of the rotary drilling tool (100) with at least two grooves (9) located approximately opposite one another and terminating axially at the leading end of said tool blank and open in a substantially continuous manner to the conveying flutes (8) formed between the turns of the conveying helix (3).

3. Method of forming rotary drilling tools (1, 100, 101) for working on materials subject to brittle failure, such as rock drilling tools for hammer drilling equipment, comprising shaping an axially extending conveying helix (3) in an axially extending tool blank (11) with the helix being arranged in an axially extending section of the tool blank between an axially extending shank (2) and an axially extending cutting head region (4), forming the cutting head region (4) free of any conveying helix with an axial extent (1) of at least 10% of the maximum diameter (d) of the tool in an axially extending region of the conveying region, forming the cutting head region (4) with the diameter (d) of the cutting head region reduced in parts thereof and forming the cutting head region (4) of the rotary drilling tool (1, 100, 101) at the same time that the conveying helix (3) is formed.

4. Method, as set forth in claim 1 or 3, wherein forming the cutting head region (4) in one of a cold rolling process and warm rolling process.

5. Method, as set forth in claim 4, wherein forming the conveying helix in a rolling operation using one of cylinder rolls, flat jaw rollers and segmental jaw rollers having at least one shaping segment (20, 21, 22).

* * * * *